United States Patent [19]

Hoekstra

[11] Patent Number: 5,701,116
[45] Date of Patent: Dec. 23, 1997

[54] BUFFERED TRAILER LIGHT CONVERTER

[75] Inventor: Eric Hoekstra, Coopersville, Mich.

[73] Assignee: Mascotech, Inc., Taylor, Mich.

[21] Appl. No.: 313,499

[22] Filed: Sep. 27, 1994

[51] Int. Cl.$^6$ ........................................... G08B 21/00
[52] U.S. Cl. .................. 340/431; 340/468; 307/9.1; 307/10.1; 307/10.8
[58] Field of Search ........................ 340/431, 472, 340/473, 482, 468; 307/9.1, 10.1, 10.8; 315/77, 82, 83

[56] References Cited

U.S. PATENT DOCUMENTS

| | | | |
|---|---|---|---|
| 3,576,444 | 4/1971 | Roberts | 340/471 |
| 3,740,714 | 6/1973 | Ballou | 340/471 |
| 3,849,664 | 11/1974 | Bryant | 315/77 |
| 3,883,845 | 5/1975 | DeVita | 340/431 |
| 3,970,860 | 7/1976 | Purdy | 340/477 |
| 4,005,313 | 1/1977 | Tibbits | 307/10.1 |
| 4,006,453 | 2/1977 | Bryant | 340/431 |
| 4,057,310 | 11/1977 | Young | 439/35 |
| 4,064,413 | 12/1977 | Andersen | 315/77 |
| 4,270,115 | 5/1981 | Bonnett | 340/431 |
| 4,325,052 | 4/1982 | Koerner | 340/431 |
| 4,405,190 | 9/1983 | Schroeder | 439/503 |
| 4,718,853 | 1/1988 | Orbanic | 439/35 |
| 4,751,431 | 6/1988 | Ducote | 315/77 |
| 4,842,524 | 6/1989 | Hopkins | 439/35 |
| 4,896,137 | 1/1990 | Lee, III et al. | 340/479 |
| 4,939,503 | 7/1990 | Swanson | 340/468 |
| 5,030,938 | 7/1991 | Bondzeit | 340/431 |
| 5,212,469 | 5/1993 | Avellino | 340/475 |
| 5,389,823 | 2/1995 | Hopkins et al. | 307/10.1 |

*Primary Examiner*—Jeffery Hofsass
*Assistant Examiner*—Julie Lieu

[57] ABSTRACT

A system for converting the tail light signals of a towing vehicle to control the tail lights of a towed vehicle. The converter includes full buffering for all input signals thereby minimizing any loading effect caused by the converter or the towed vehicle. Also, the converter employs an override circuit so that the towed vehicle brake lights operate even if the emergency flashers have been activated on the towing vehicle.

4 Claims, 1 Drawing Sheet

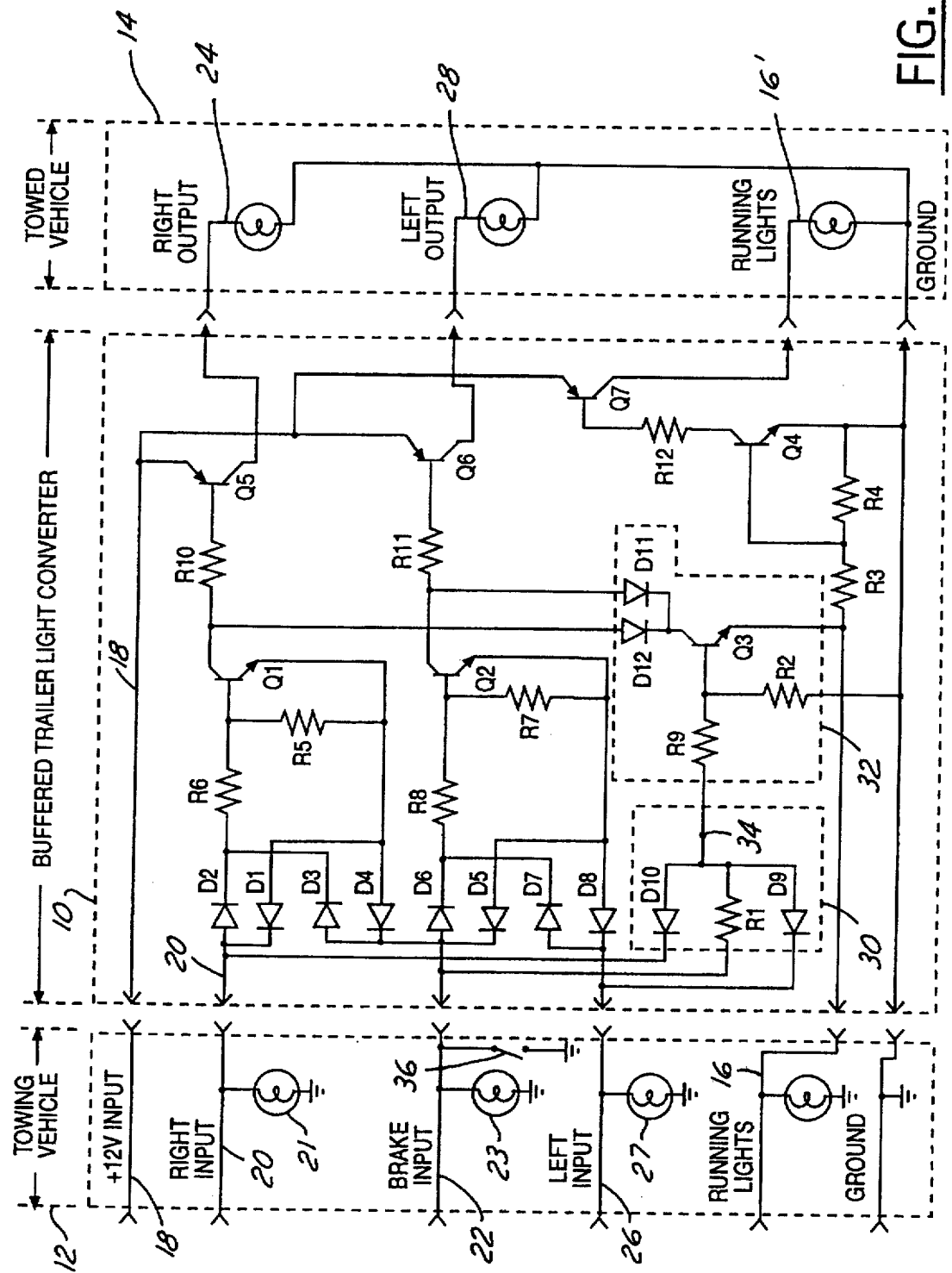

BUFFERED TRAILER LIGHT CONVERTER

TECHNICAL FIELD

The present invention relates to electronic converter circuits which are used to sense light signals generated by a towing vehicle and drive the lighting circuits of a towed vehicle in response to the sensed light signals.

BACKGROUND OF THE INVENTION

Devices for interfacing the tail light signals of a towing vehicle with the tail lights of a towed vehicle are well-known. For example, U.S. Pat. Nos. 4,005,313; 4,057,310; 4,270,115; 4,405,190; 4,718,853; 4,842,524; and 4,939,503 all disclose tail light adapting circuits. Some of these patents disclose a system for adapting a three lamp (5 wire) system of a towing vehicle to a two lamp (4 wire) system of a towed vehicle. Additionally, some of these patents describe systems for simplifying the wiring between a towed vehicle and a towing vehicle. In these devices, no logic functions are performed.

Still, other U.S. patents, such as U.S. Pat. Nos. 4,939,503; 3,849,664; 3,883,845; 3,970,860; 4,006,453; 4,064,413; 4,325,052; 4,751,431; 5,030,938; 5,212,469, disclose trailer light converter systems having certain advantages. For example, U.S. Pat. No. 5,030,938 discloses a system for buffering the towed vehicle tail lights from the towing vehicle tail lights. Such buffering is known to be advantageous to prevent interference (i.e. electrical loading) to the towing vehicle lights by the towed vehicle lights. Buffering is especially important with newer vehicles which are wired with lighter gauge wire and with vehicles which have lamp-out detection circuits and/or electronic flashers. Additionally, buffering of the signal circuits will prevent changes in the flash rate or duty cycle of the flasher of the towing vehicle when connected to a towed vehicle.

One disadvantage noted in all the above-referenced patents is that none of them allow the brake signal to override the emergency flasher signal (i.e. the brake signal function is lost during emergency flasher operation). In all of the above-referenced patents, if the emergency flashers are activated and the brake pedal is engaged, the right and left tail lights of the towed vehicle will flash. It is believed that this condition (i.e. of having the emergency flashers take priority over the brake light signal) is undesirable and that when the emergency flashers are active concurrently with braking, the brake lights should override the emergency flasher signal leaving the right and left tail lights of the towed vehicle illuminated without interruption. The converter of the present invention accomplishes this emergency flasher override and maintains the brake signal function throughout all modes of flasher operation.

SUMMARY OF THE INVENTION

The present invention provides a trailer signal light converter which utilizes the signal lights of a towing vehicle to control the left and right tail lights of a towed vehicle. The towing vehicle is of the type having separate lamps for the left turn, right turn, and brake signaling functions. The converter of the present invention uses a circuit for sensing the concurrent activation of the right, left, and brake tail light signals of the towing vehicle. If the concurrent activation of these signals is sensed, a circuit overrides the signals present on the right and left brake tail lights of the towing vehicle and activates the right and left tail lights of the towed vehicle in a manner which tracks the brake signal of the towing vehicle (and in effect ignores the emergency flasher signal of the towing vehicle).

In a preferred embodiment of the present invention, a buffer is used to couple the converter between the towing vehicle signal lights and the towed vehicle lights. Therefore, only negligible electrical loading is imposed on the left turn, right turn and brake signaling circuits of the towing vehicle.

Other advantages and meritorious features of the present invention will become more fully understood from the following description of the preferred embodiments, the appended claims, and the drawings, a brief description of which follows.

BRIEF DESCRIPTION OF THE DRAWINGS

FIG. 1 is an electric schematic diagram of the preferred embodiment converter of the present invention.

DETAILED DESCRIPTION OF THE PREFERRED EMBODIMENT

Now referring to FIG. 1, buffered trailer light converter 10 is adapted to sense the signals sent to the tail lights of a towing vehicle 12 and to logically convert those signals to energize the appropriate tail lights of the towed vehicle 14. Ideally, this conversion process should be accomplished with minimum electrical loading or other interference on the operation of the tail lights of towed vehicle 12. The following MODES will be used to explain the operation of buffered trailer light converter 10.

MODE 1: RUNNING LIGHTS ACTIVE

MODE 2: RIGHT INPUT ACTIVE/BRAKES INACTIVE/LEFT INPUT INACTIVE.

MODE 3: RIGHT INPUT INACTIVE/BRAKES INACTIVE/LEFT INPUT ACTIVE.

MODE 4: RIGHT INPUT ACTIVE/BRAKE ACTIVE/LEFT INPUT INACTIVE.

MODE 5: RIGHT INPUT INACTIVE/BRAKE ACTIVE/LEFT INPUT ACTIVE.

MODE 6: RIGHT INPUT ACTIVE /BRAKE ACTIVE/LEFT INPUT INACTIVE.

MODE 7: RIGHT INPUT ACTIVE/BRAKE INACTIVE/LEFT INPUT ACTIVE.

MODE 8: RIGHT INPUT ACTIVE/BRAKE ACTIVE/LEFT INPUT ACTIVE.

MODE 1

Running light circuit of buffered trailer light converter 10 consists of R3, R4, R12, Q4, and Q7. When the running lights are turned on in the towing vehicle, line 16 goes high (+12 volts) forward biasing the base/emitter junction of Q4 thereby causing Q4 to saturate and turn on Q7. Q7 acts as a switch connecting line 16' to +12 volts. It is important to note that towed vehicle running lights 16' do not significantly load running light circuit 16. Thus, Q4 and Q7 of buffered trailer light converter 10 act as buffers and effectively isolate running light 16' of towed vehicle 4 from running lights 16 of towing vehicle 12. This buffered feature is also present for the right output and left output circuits of towed vehicle 14.

MODE 2: RIGHT INPUT ACTIVE/BRAKES INACTIVE/LEFT INPUT INACTIVE

In this mode, right input line 20 cycles high and low causing lamp 21 to flash. This high and low cycling signal is delivered to D2. During the high portion of the cycle D2 is forward biased thereby forward biasing the base-emitter junction of Q1. Because brake input 22 is inactive, line 22 presents a low impedance path to ground of the current flowing through the base emitter junction of Q1. Thus, current flows through Q1 to ground by way of D4 and lamp 23, the flow of current through the base emitter junction of Q1 saturates Q1 thereby saturating Q5 thereby directing current through line 24 of towed vehicle. This current allows right output lamp of towed vehicle to flash in synchronism with right input lamp 21 of towing vehicle.

During the low portion of the right input cycling signal, Q1 and Q5 are in cutoff and no current flows through right output lamp of towed vehicle 14.

MODE 3: RIGHT INPUT INACTIVE/BRAKES INACTIVE/LEFT INPUT ACTIVE

In this mode, the circuit operates analogously to that of mode 2 except that D7 is forward biased during the high portion of the cycling of line 26 and Q2 is forward biased in as much as a low impedance path to ground is formed by lamp 23 and D5. Accordingly, Q2 is saturated thereby saturating Q6 and allowing current to flow through line 28 thereby illuminating left output lamp of towed vehicle 14. During the low portion of the cycling left input signal, Q2 and Q6 are in cutoff and no current flows through line 28.

MODE 4: RIGHT INPUT ACTIVE/BRAKE ACTIVE/LEFT INPUT INACTIVE

In this mode of operation, brake input 22 is high which causes left output 28 to go high and illuminate left output lamp of towed vehicle 14. In this mode, because right input 20 is cycling high and low, during the low portion of the cycle, Q1 is turned on by way of current flowing from line 22 through forward biased D3 through the base-emitter junction of Q1, and to the low impedance path to ground formed by forward biased D1 and lamp 21. During the high portion of the right input cycle, both lines 20 and 22 have high signals present on them; Q1 is then in cutoff because there is no low impedance path to ground enabling current to flow through the base-emitter Junction of Q1. Thus, right output line 24 of towed vehicle 14 remains low and right output lamp of towed vehicle 14 does not illuminate. Thus, when the brake input is activated and the right input is activated, the right output of towed vehicle 14 flashes in synchronism with the right input of towing vehicle 12. However, its flashing sequence is inverted from that of lamp 21. Specifically, when lamp 21 is illuminated, right output lamp of towed vehicle 14 is extinguished and when lamp 21 is extinguished, right output lamp of towed vehicle 14 is illuminated.

MODE 5: RIGHT INPUT INACTIVE/BRAKE ACTIVATED/LEFT INPUT ACTIVATED

In this mode of operation, the circuit operates analogously to that which was explained in mode 4 except that the right output lamp of towed vehicle 14 remains illuminated and the left output lamp of towed vehicle 14 flashes in synchronism (albeit out of phase) with lamp 27.

MODE 6: RIGHT INPUT ACTIVE/BRAKE INACTIVE/LEFT INPUT ACTIVE

In this mode of operation, both right and left inputs are active. This designates that the emergency flashers have been activated by the vehicle operator and lamp 21 and lamp 27 are flashing in synchronism. Because brake input 22 has not been activated in this mode, line 22 presents a low impedance path to ground by way of lamp 23 to the emitter of Q1 and the emitter of Q2. Thus, with the right input and left input providing flashing signals, Q1 and Q2 are respectively driven between cutoff and saturation in synchronism with the cycling signals placed on their base and accordingly, right output line 24 and left output line 28 of towed vehicle 14 are cycled high and low in synchronism with the signals presented on lines 20 and 26 respectively. Thus, when the emergency flashers are placed on by the vehicle operator and there is no brake input 22, right output lamp and left output lamp of towed vehicle 14 flash in synchronism (and in phase) with one another and lamps 21 and 27.

MODE 7: RIGHT INPUT ACTIVE/BRAKE INPUT ACTIVE/LEFT INPUT ACTIVE

In this mode, the emergency flashers are activated and the vehicle operator has activated the brakes. Thus, lines 20, 22, 26 are all high and although the bases of Q1 and Q2 have a positive voltage applied thereon, there is no low impedance path to ground presented to the emitters of Q1 and Q2 respectively and accordingly, Q1 and Q2 remain in cutoff. If nothing more was presented in the present circuit, right output lamp 24 and left output lamp 28 of towed vehicle 14 would remain extinguished during the condition where the emergency flashers and the brake input were simultaneously activated. However, two circuits are present which prevent this condition and allow the brake input signal to override the cutoff condition of Q5 and Q6 thereby activating right output and left output lamps of towed vehicle 14. The two circuits which enable this override condition are sense circuit 30 and override circuit 32.

Sense circuit 30 provides a current path between node 34 and lines 20, 22, and 26. The values of R9 and R2 are selected such that Q3 will only saturate when lines 20, 22, and 26 are all high simultaneously. If either line 26 or 20 is low, the current sourced through R1 by line 22 will be shunted to ground by D9 or D10. The voltage at node 34 will be below the turn-on threshold set by R9 and R2 and Q3 will remain in cut-off. Thus, for all the modes previously discussed herein (mode 1 through mode 6) no condition existed such that lines 20, 22, and 26 were high simultaneously. Thus, circuits 30 and 32 did not come into play for any of the previously discussed modes. However, in mode 7, lines 20, 22, and 26 are all high simultaneously thereby elevating the voltage on node 34 sufficiently high to forward bias Q3 and drive it into saturation. Once Q3 is saturated, the emitter base junction of Q5 and Q6 are forward biased and the right output lamp and left output lamp of tow vehicle 14 are illuminated.

Although Q1 through Q7 can be any type of switching device, in its preferred embodiment, the buffered trailer light converter of the present invention uses NPN transistors for Q1, Q2 and Q4. Q3 is preferably a NPN darlington transistor and Q5 through Q7 are preferably PNP darlington transistors. Of course, any of the transistors shown herein can be of the general purpose switching type, darlington type, or even MOSFET transistors with only slight component value chances to the circuit. Such changes are well known to those skilled in the art.

The description of the buffered trailer light converter 10, heretofore has assumed that the towing vehicle 12 utilizes a three tail light system. If this is not the case and the towing vehicle 12 utilizes a two tail light system, line 22 is simply grounded by way of switch 36. If buffered trailer light converter 10 is used on a two tail light system, the brake override feature (as has already been discussed in conjunction with the emergency flashers) will not operate and the right output and left output lamps of the towed vehicle 14 will operate as dictated by the right input and left input lines of the towing vehicle 12. Accordingly, in this mode, if the circuit which controls the operation of lamps 21 and 27 is effective for overriding the emergency flasher signal when the brakes are active, right output and left output of towed vehicle 14 will likewise track the operation of lamps 21 and 27.

The foregoing detailed description shows that the preferred embodiments of the present invention are well suited to fulfill the objects of the invention. It is recognized that those skilled in the art may make various modifications or additions to the preferred embodiments chosen here to illustrate the present invention without departing from the spirit of the present invention. Accordingly, it is to be understood that the subject matter sought to be effected protection hereby should be deemed to extend to the subject matter defined in the appended claims, including all fair equivalents thereof.

I claim:

1. A trailer light converter for utilizing the tail light signals of a towing vehicle to control the left and right tail lights of a towed vehicle, said towing vehicle of the type having a right tail light signal, a left tail light signal, and a brake tail light signal and an emergency flasher mode of operation and a brake mode of operation, said converter, comprising:

means including a resistor and two diodes for sensing the simultaneous activation of said emergency flasher mode and said brake mode, electronic logic circuit means, including a darlington transistor coupled to said sensing means, for generating one, and only one, output signal in response to, and only in response to, said simultaneous activation of said emergency flasher mode and said brake mode, means, coupled to said generating means, for activating said left and right tail lights of said towed vehicle in a manner consistent with the brake tail light signal of the towing vehicle in response to said output signal of said generating means.

2. A buffered trailer light converter having a brake light override feature, said converter for using the tail light signals of a towing vehicle to control the left and right tail lights of a towed vehicle, said towing vehicle of the type having a right tail light signal, left tail light signal, and brake tail light signal, said converter comprising:

a first electronic circuit for sensing a single voltage signal representative of a condition where said right tail light signal, left tail light signal, and brake tail light signal of said towing vehicle are concurrently activated, wherein said first electronic circuit further includes means for sensing, with respect to ground, the voltage level of said single voltage signal, wherein means for sensing comprises a darlington transistor, and means for sending a signal to activate said right and left tail lights of said towed vehicle when said single voltage signal exceeds a predetermined voltage level.

3. The converter of claim 2, wherein said first circuit is comprised of a first, second, and third current path, connected to a common node, said first path extending between said right tail light signal and said common node, said second path extending between said brake tail light signal and said common node, said third path extending between said left tail light signal and said common node.

4. The converter of claim 3, wherein said first and third current paths are comprised of diodes.

* * * * *